US011165238B2

(12) United States Patent
Schweitzer, III et al.

(10) Patent No.: US 11,165,238 B2
(45) Date of Patent: Nov. 2, 2021

(54) ELECTRICAL ARC EVENT DETECTION IN AN ELECTRIC POWER SYSTEM

(71) Applicant: Schweitzer Engineering Laboratories, Inc., Pullman, WA (US)

(72) Inventors: Edmund O. Schweitzer, III, Pullman, WA (US); David E. Whitehead, Pullman, WA (US); David J. Casebolt, Moscow, ID (US); Krishnanjan Gubba Ravikumar, Pullman, WA (US); Austin Edward Wade, Moscow, ID (US); Lisa Gayle Nelms, Colfax, WA (US); Brian R. Clark, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 32 days.

(21) Appl. No.: 16/788,408

(22) Filed: Feb. 12, 2020

(65) Prior Publication Data
US 2021/0111549 A1    Apr. 15, 2021

Related U.S. Application Data

(60) Provisional application No. 62/914,496, filed on Oct. 13, 2019.

(51) Int. Cl.
*H02H 3/04* (2006.01)
*H02H 1/00* (2006.01)

(52) U.S. Cl.
CPC ........ *H02H 1/0023* (2013.01); *H02H 1/0061* (2013.01)

(58) Field of Classification Search
CPC .. H02H 1/0023; H02H 1/0061; H02H 1/0015; H02H 3/044
See application file for complete search history.

(56) References Cited

U.S. PATENT DOCUMENTS

| 6,396,279 | B1 | 5/2002 | Gruenert |
| 6,608,493 | B2 | 8/2003 | Hensler |
| 6,795,789 | B2 | 9/2004 | Vandiver |
| 6,847,297 | B2 | 1/2005 | Lavoie |

(Continued)

OTHER PUBLICATIONS

PCT/US2020/053175 International Search Report and Written Opinion of the International Searching Authority dated Dec. 22, 2020.

(Continued)

*Primary Examiner* — Sisay G Tiku
(74) *Attorney, Agent, or Firm* — Jared L. Cherry

(57) ABSTRACT

The present disclosure pertains to systems and methods for monitoring electrical arc events in an electric power system. In one embodiment, a system may comprise an arc flash detection (AFD) unit to detect electromagnetic radiation generated by an electrical arc event, a primary protection relay to generate measurements of an electric current, and an integrator. In various embodiments, the integrator may comprise a communication port to receive the detection of the electrical arc event and the measurements of the electric current. The integrator may also comprise a processing subsystem to validate the detection of the electrical arc and generate protective actions to interrupt the flow of the current to the electrical arc event.

22 Claims, 7 Drawing Sheets

(56) References Cited

U.S. PATENT DOCUMENTS

| | | | |
|---|---|---|---|
| 6,892,115 B2 | 5/2005 | Berkcan | |
| 6,892,145 B2 | 5/2005 | Topka | |
| 6,909,942 B2 | 6/2005 | Andarawis | |
| 6,985,784 B2 | 1/2006 | Vandevanter | |
| 6,999,291 B2 | 2/2006 | Andarawis | |
| 7,012,421 B2 | 3/2006 | Lavoie | |
| 7,043,340 B2 | 5/2006 | Papallo | |
| 7,058,481 B2 | 6/2006 | Jiang | |
| 7,058,482 B2 | 6/2006 | Fletcher | |
| 7,068,483 B2 | 6/2006 | Papallo | |
| 7,068,612 B2 | 6/2006 | Berkcan | |
| 7,111,195 B2 | 9/2006 | Berkcan | |
| 7,117,105 B2 | 10/2006 | Premerlani | |
| 7,151,329 B2 | 12/2006 | Andarawis | |
| 7,254,001 B2 | 8/2007 | Papallo | |
| 7,259,565 B2 | 8/2007 | Diercks | |
| 7,262,943 B2 | 8/2007 | Stellato | |
| 7,301,738 B2 | 11/2007 | Pearlman | |
| 7,460,590 B2 | 12/2008 | Lee | |
| 7,532,955 B2 | 5/2009 | Dougherty | |
| 7,636,616 B2 | 12/2009 | Fletcher | |
| 7,693,607 B2 | 4/2010 | Kasztenny | |
| 7,747,354 B2 | 6/2010 | Papallo | |
| 7,747,356 B2 | 6/2010 | Andarawis | |
| 7,986,503 B2 | 7/2011 | Papallo | |
| 8,024,494 B2 | 10/2011 | Soed | |
| 8,213,144 B2 | 7/2012 | Papallo | |
| 8,319,173 B2 * | 11/2012 | Schweitzer, III | H02H 1/0069 250/227.11 |
| 8,560,255 B2 | 10/2013 | Elwarry | |
| 8,664,961 B2 * | 3/2014 | Zeller | H02H 3/044 324/536 |
| 8,891,963 B2 | 11/2014 | Patel | |
| 9,046,391 B2 * | 6/2015 | Schweitzer, III | G01D 18/00 |
| 9,366,711 B2 | 6/2016 | Klapper | |
| 9,632,147 B2 | 4/2017 | Hensler | |
| 9,653,904 B2 * | 5/2017 | Schweitzer, III | G01D 18/00 |
| 9,819,611 B2 | 11/2017 | Snowdon | |
| 10,178,047 B2 | 1/2019 | Chapman | |
| 10,379,991 B2 | 8/2019 | Yang | |
| 10,644,493 B2 * | 5/2020 | Gubba Ravikumar | H02H 3/00 |
| 10,804,689 B2 * | 10/2020 | Zeller | H02H 1/0015 |
| 10,896,658 B1 * | 1/2021 | Schweitzer, III | G09G 5/006 |
| 10,951,057 B1 * | 3/2021 | Schweitzer, III | H02H 1/06 |
| 2003/0048508 A1 | 3/2003 | Yu | |
| 2007/0239372 A1 | 10/2007 | Schweitzer | |
| 2009/0012728 A1 | 1/2009 | Spanier | |
| 2009/0296583 A1 | 12/2009 | Dolezilek | |
| 2010/0026425 A1 * | 2/2010 | Roscoe | H02H 1/0023 335/7 |
| 2010/0040068 A1 | 2/2010 | Wimmer | |
| 2010/0072352 A1 * | 3/2010 | Kesler | H02H 1/0023 250/216 |
| 2010/0073013 A1 * | 3/2010 | Zeller | H02H 3/044 324/551 |
| 2010/0073830 A1 * | 3/2010 | Schweitzer, III | G01J 1/0228 361/42 |
| 2010/0073831 A1 * | 3/2010 | Schweitzer, III | H02H 3/093 361/42 |
| 2010/0183298 A1 | 7/2010 | Biegert | |
| 2011/0141644 A1 * | 6/2011 | Hastings | H02H 1/0015 361/93.2 |
| 2014/0063661 A1 * | 3/2014 | D'Aversa | H02P 29/02 361/23 |
| 2015/0244160 A1 * | 8/2015 | Schweitzer, III | H02H 3/044 250/227.11 |
| 2015/0372482 A1 * | 12/2015 | Kumfer | H02H 9/043 361/57 |
| 2016/0013632 A1 | 1/2016 | Lloyd | |
| 2017/0026291 A1 | 1/2017 | Smith | |
| 2017/0288950 A1 | 10/2017 | Manson | |
| 2018/0034689 A1 | 2/2018 | Kanabar | |
| 2018/0089057 A1 | 3/2018 | Yang | |
| 2018/0145496 A1 | 5/2018 | Zeller | |
| 2018/0348267 A1 | 12/2018 | Yang | |
| 2019/0079134 A1 | 3/2019 | Donolo | |
| 2021/0014196 A1 * | 1/2021 | Schweitzer, III | H04L 63/0227 |
| 2021/0057901 A1 * | 2/2021 | Schweitzer, III | H02H 7/261 |
| 2021/0111586 A1 * | 4/2021 | Schweitzer, III | H02J 13/00002 |

OTHER PUBLICATIONS

David Costello: Understanding and Analyzing Event Report Information, Oct. 2000.

Joe Perez: A Guide to Digital Fault Recording Event Analysis, 2010.

Considerations for Use of Disturbance Recorders; a Report to the System Protection Subcommittee of the Power System Relaying Committee of the IEEE Power Engineering Society, Dec. 27, 2006.

David Costello: Event Analysis Tutorial, Part 1: Problem Statements 2011.

Jane Starck, Antti Hakala-Ranta, Martin Stefanka, Switchgear Optimization Using IEC 61850-9-2 and Non-Conventional Measurements May 23, 2012.

Will Allen, Tony Lee: Flexible High-Speed Load Shedding Using a Crosspoint Switch Oct. 2005.

Qiaoyin Yang, Rhett Smith: Improve Protection Communications Network Reliability Throught Software-Defined Process Bus, Jan. 2018.

Caitlin Martin, Steven Chase, Thanh-Xuan Nguyen, Dereje Jada Hawaz, Jeff Pope, Casper Labuschagne: Bus Protection Considerations for Various Bus Types; Oct. 2013.

\* cited by examiner

ELECTRICAL ARC EVENT DETECTION IN AN ELECTRIC POWER SYSTEM

RELATED APPLICATIONS

This application claims the benefit of priority under 35 U.S.C. § 119(e) to U.S. Provisional Patent Application No. 62/914,496, filed Oct. 13, 2019, and entitled "Electrical Arc Event Detection in an Electric Power System," the contents of which is hereby incorporated by reference in its entirety.

TECHNICAL FIELD

This disclosure relates to monitoring electric power systems. More particularly, this disclosure relates to detecting and validating electrical arc events in electric power systems.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1A:
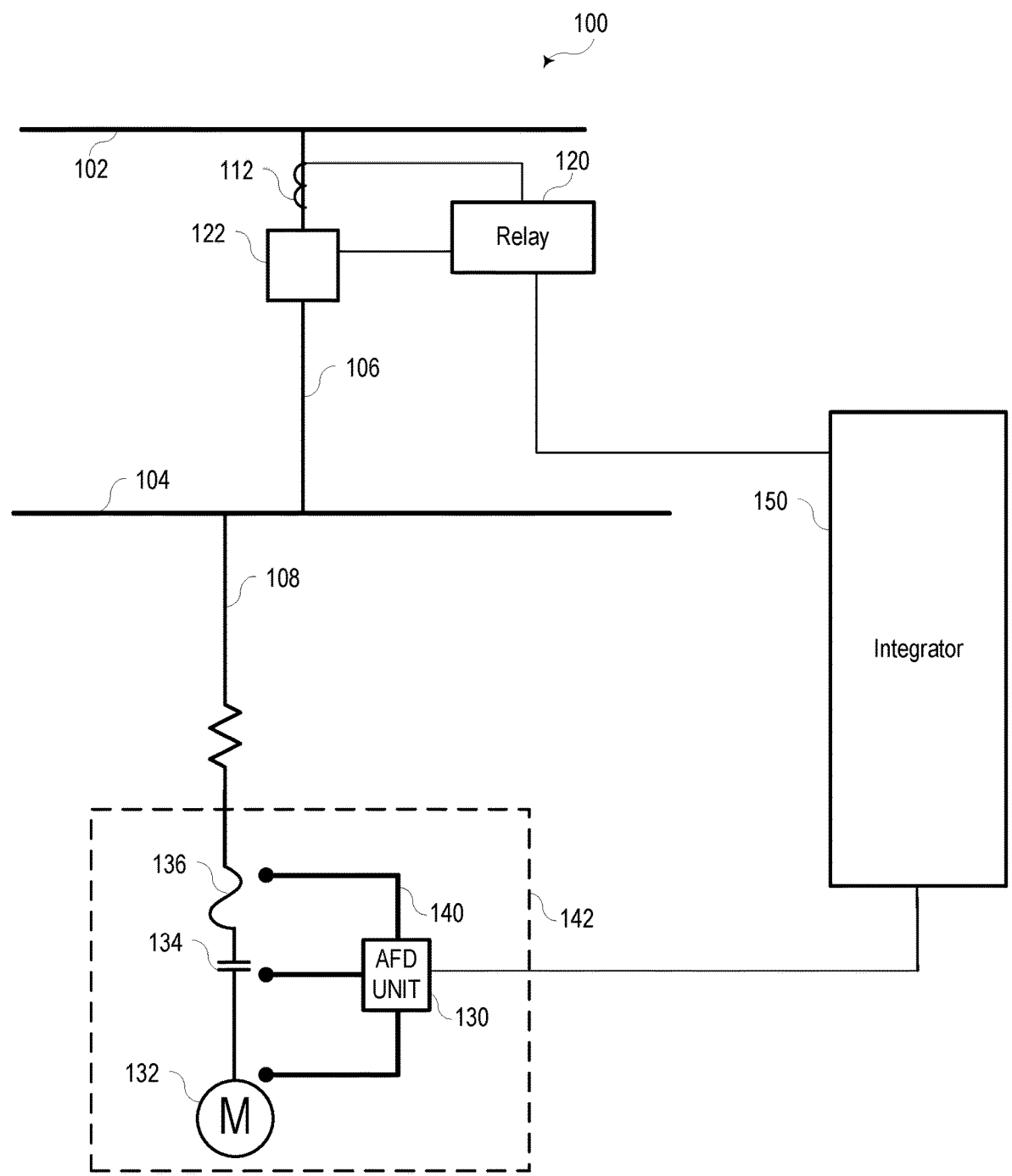
FIG. 1A illustrates a simplified one-line diagram of an electric power system, including an arc flash event protection system in accordance with the present disclosure.

Electric power systems are used to generate, transmit, and distribute electric power to loads, and serve as an important part of critical infrastructure. Electric power systems may experience faults that give rise to electrical arc events. An electrical arc event is a dangerous condition associated with the release of energy. Electrical arc events may produce extreme temperatures, high levels of thermal energy that can generate flying shrapnel, pressure waves, and sound waves.

An electrical arc event may also produce electro-optical radiation, including visible and ultraviolet light, in the vicinity of the electrical arc. An arc flash event may be detected using an optical sensor to detect an electrical arc flash (e.g., the emission of electro-optical radiation) and an electrical sensor to detect an increase in current associated with the arc flash event. Use of information from an optical sensor and an electrical sensor may help to reduce the "total arcing time" associated with an electrical arc flash. The "total arcing time" refers to the total time required to detect the electrical arc flash and to actuate protective elements in order to interrupt the flow of electrical current feeding the arc. In certain circumstances, the "total arcing time" may be used to calculate the energy released by the electrical arc event, which may be related to the potential damage that could be caused by the electrical arc. Accordingly, reducing the "total arcing time" may improve the safety and/or reliability of an electric power system.

Arc flash detection systems may be incorporated in a single device including an optical sensor for detecting an optical Time Over Light (TOL) event generated by the arc flash and an instantaneous Phase Arc Flash (50PAF) over current element to detect an increased current flow associated with the arc. The combination of these two sensors in a single device has limited use of such systems for various reasons. For example, a switchgear configuration may make it physically impossible for optical detectors, which are limited in their length, to be located in areas where arcs may occur (e.g., motor drawers). In addition to limitations on the length of optical detectors, the physical size of devices to process optical and electrical signals may restrict the use of arc flash detection systems.

The inventors of the present disclosure have recognized that certain advantages may be achieved by separating the optical sensor and electrical sensors and using an integrator or merging unit to combine and analyze the data. Such advantages may include the ability to independently place each sensor, to add arc flash protection to existing electric power systems utilizing electrical sensors already in place, and to increase redundancy in the detection of faults, and many others.

In various embodiments consistent with the present disclosure, arc flash detection ("AFD") units may be placed in one or more locations where an arc flash may occur. The AFD units may communicate data to an integrator unit. If a TOL event occurs, the integrator may evaluate electrical data from primary protective relays associated with conductors feeding the switchgear segment to detect a 50PAF event. If both a TOL event and 50PAF event occur, the integrator may interrupt the flow of electrical power and minimize the damage caused by the arc flash event.

The communication between the primary protective relays and the integrator, and between the AFDs and the integrator, enable rapid and selective arc flash tripping that can be performed to achieve maximum safety and minimum load interruption. Further, this architecture may allow for arc flash detection to be added to systems without replacing existing primary protective relays. Instead, data from existing primary protective relays may be provided to a merging unit. For example, an existing relay may analyze electric current measurements for abnormal electrical conditions and generate a 50PAF output that may be provided to a merging unit. The merging unit may prepare data received from a variety of sources for use by the integrator. In various embodiments consistent with the present disclosure, a merging unit may incorporate optical data from one or more AFDs, and potentially a variety of other devices, to implement arc flash detection protection in existing systems.

In some cases, primary protective relays may communicate with various other supervisory devices such as integrators, automation systems, monitoring systems, supervisory (SCADA) systems, and other intelligent electronic devices (IEDs). In some cases, communication between the primary protection relays and the supervisory devices may not be needed for the primary protection relays to perform the primary protection operations. For instance, in accordance with several embodiments herein, the primary protection operations performed by the primary protection relays are physically separated from various other functions performed by the supervisory devices and systems. As such, the primary protective relays may continue to provide monitoring and protection operations even if such communications become unavailable.

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor do the steps need to be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations. For example, throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Several aspects of the embodiments disclosed herein may be implemented as software modules or components. As used herein, a software module or component may include any type of computer instruction or computer executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory machine-readable medium having stored thereon instructions that may be used to program a computer or other electronic device to perform processes described herein. The non-transitory machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable media suitable for storing electronic instructions. In some embodiments, the computer or another electronic device may include a processing device such as a microprocessor, microcontroller, logic circuitry, or the like. The processing device may further include one or more special purpose processing devices such as an application specific interface circuit (ASIC), PAL, PLA, PLD, field programmable gate array (FPGA), or any other customizable or programmable device.

FIG. 1A illustrates a simplified one-line diagram of a portion of an electric power system 100, including an arc flash protection system in accordance with the present disclosure. In some cases, the arc flash protection system may obtain information from the electric power system and implement control actions based on the detection of an arc flash event.

The portion of the electrical power system in FIG. 1A provides power to an electric motor 132. Electrical power is provided by bus 102. A breaker 122 separates bus 102 from bus 104. Breaker 122 may be used to selectively connect and disconnect bus 102 from bus 104 for various purposes, such deenergizing bus 104 in the event of an arc flash event. It should be noted that the system may include multiple phases and additional equipment and complexity.

A primary protection relay 120 may monitor a flow of current between bus 102 and bus 104 using a current transformer 112. As illustrated, the primary protection relay 120 may obtain current signals directly from the current transformer 112. Although not shown, primary protection relay 120 may, in some embodiments, include potential transformers for monitoring a voltage of bus 102 and/or bus 104. Primary protection relay 120 may implement protective actions based on the current and/or voltage signals. For example, the primary protection relay 120 may determine overcurrent conditions, time-overcurrent conditions, current differential conditions, neutral overcurrent conditions, restricted earth fault conditions, directional power conditions, and the like.

Upon detection of a condition outside of predetermined operating conditions, the primary protection relay 120 may send an open or trip command to the circuit breaker 122, thus effecting a trip protective action. Accordingly, the primary protection relay 120 may provide protective functions to equipment of the electric power system. Such protective functions may include arc flash event protection.

An AFD unit 130 may detect an optic signal created by an arc flash event detection. In some examples, the AFD unit 130 may be located in a motor control center "bucket" or "drawer" 142. The AFD unit 130 may also include one or more optical detectors 140. Three optical detectors are illustrated in FIG. 1A, but any number of optical detectors are contemplated by the present disclosure. The optical detectors may be embodied as optical receivers, optical sensors, or any other devices capable of detecting electromagnetic radiation generated by an arc flash event. The optical detectors 140 collect light from an electrical arc event and transfers it to the receiver. In certain embodiments, the optical detectors 140 may be connected to the AFD unit 130 by fiber optic cable or any other material suitable for conducting light. AFD unit 130 digitizes the optical signals.

Embodiments consistent with the present disclosure may utilize point sensors, loop sensors, or other types of light-collecting sensors. A point sensor may use a light sensor and an optical receiver to detect light in a given area, while the loop sensor may use a loop of bare optical fiber to collect light. A loop sensor or a point sensor may be positioned strategically and in proximity to monitored equipment, such as, for example, a motor 132, a capacitor bank 134, or fuse(s) 136.

The integrator 150 may be in communication with various devices and equipment in the electric power system such as the primary protection relay 120 and the AFD unit 130. The integrator 150 may perform monitoring, automation, supervisory, communication, backup protection, electrical arc current event protection, and other functions. According to various embodiments, the AFD unit 130 may transmit signals indicating detection of electromagnetic radiation indicative of an electrical arc event to the integrator 150. Moreover, the primary protective relay 120 may transmit electric current measurements to the integrator 150.

In some cases, the primary protective relay 120 may transmit information to the integrator 150 at a variety of rates. In various embodiments, the data transmission rates may be 1 kHz, 10 kHz, 50 kHz, 100 kHz, etc. Furthermore, the primary protective relay 120 may transmit electric power system measurements (e.g., electric current measurements) in accordance with a predetermined communication protocol such as, for example, high speed delivery protocol for TOL event signals or 61850 GOOSE protocol.

The primary protective relay 120 may also transmit to the integrator 150 indications of protective actions taken by the primary protective relay 120. The primary protective relay 120 may communicate calculations, such as results of maintenance operations to the integrator 150. For example, the primary protective relay 120 may detect current, voltage, a state of a device (e.g., the circuit breaker 122), and faults, and calculate a magnitude of the current, voltage, and fault. The primary protective relay 120 may be configured to communicate to the integrator 150 the magnitude of the current, the magnitude of the voltage, the state of the device, the occurrence of the fault, a time, the distance to the fault, and a protective action that may have been taken.

Furthermore, the primary protective relay 120 may be configured to communicate to the integrator 150 when thresholds are crossed by power system conditions, even if a protective action is not taken. For example, the primary protective relay 120 may determine that an electrical current exceeds a high threshold, but has not yet reached a trip threshold.

The integrator 150 may be configured to communicate monitoring, automation, and supervisory information/instructions to the primary protective relay 120. For example, the integrator 150 may be configured to perform breaker failure analysis to determine if the breaker 122 has operated after a signal has been sent to open the breaker 122. If the integrator 150 determines that the breaker 122 has not opened, it may send instructions to the primary protective relay 120 to attempt to open the breaker 122. The integrator 150 may also signal a second breaker (not shown) to open, where the second breaker is positioned to also interrupt the flow of power to the effected portion of the electric power system 100. For example, upon failure of breaker 122, the integrator 150 may signal for the second breaker to open, removing power from the bus 104.

In various embodiments, when the integrator 150 receives a signal indicating detection of a TOL event from the AFD unit 130, the integrator 150 may validate the occurrence of an electrical arc event using information about the electrical current. In some cases, by validating the detection of the electrical arc event, the integrator 150 may recognize false positive detection of an electrical arc event and avoid unnecessary interruptions of the electric power system. For example, the integrator 150 may receive a TOL event signal from the AFD unit 130. Since the integrator 150 also receives electric current measurements from the primary protective relay 120, the integrator 150 may analyze the electric current measurements for abnormal electrical conditions such as, for example, an instantaneous 50PAF over current element. In some instances, if the integrator 150 identifies a 50PAF from the electric current measurements, the integrator 150 may determine that the electrical arc event is or has occurred and send instructions to the primary protective relay 120 to open the breaker 122 and disrupt the flow of electrical current to the electrical arc event. In some cases, the integrator 150 may send command signals directly to the breaker 122 to open the breaker 122. In other cases, if the integrator 150 does not identify a 50PAF from the electric current measurements, the integrator 150 may identify that the detected electrical arc event is a false positive. Accordingly, the integrator 150 may avoid disconnecting the electric power system.

Figure 1B:
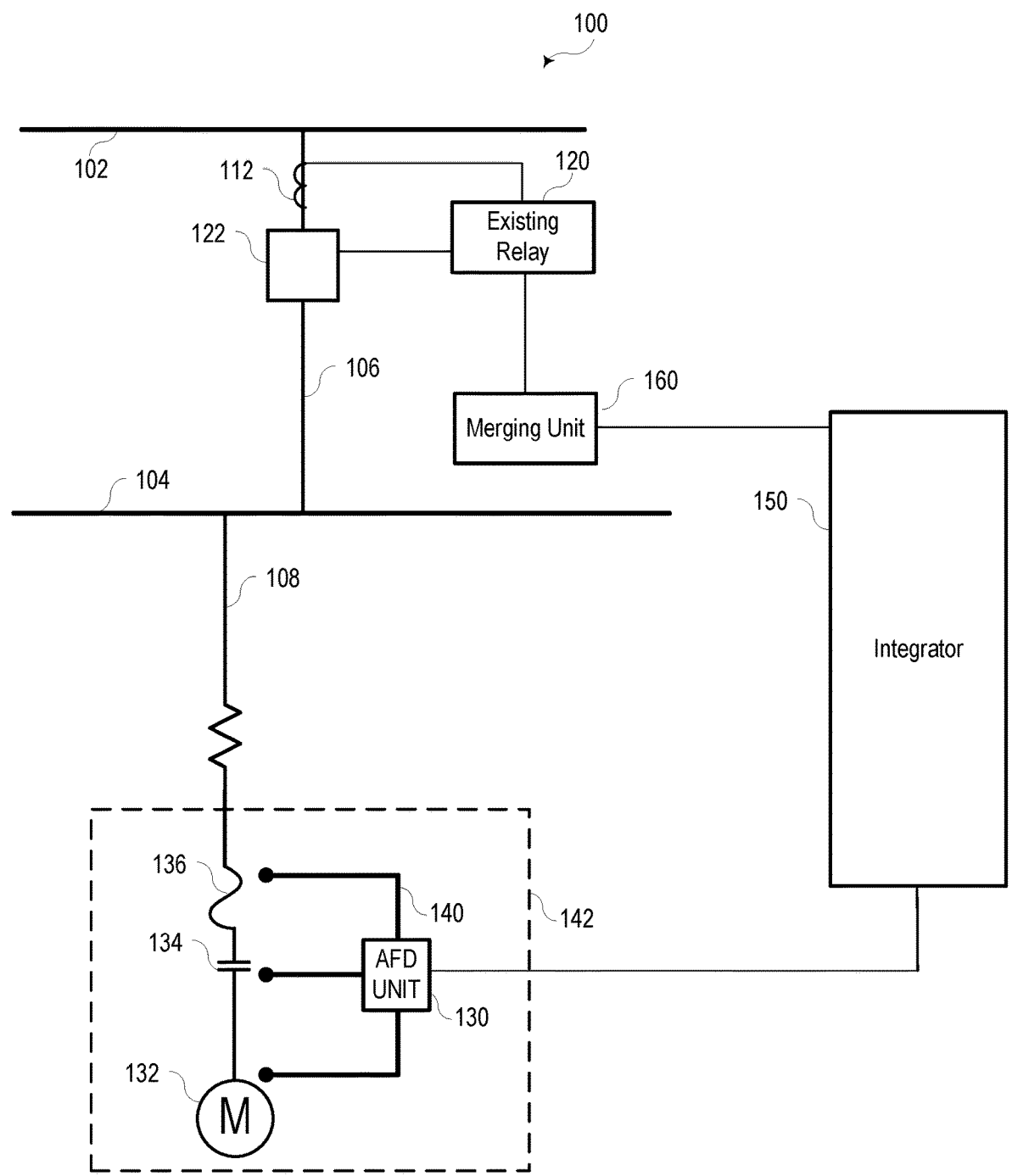
FIG. 1B illustrates a simplified one-line diagram of a portion of an electric power system, including a merging unit to receive information from an existing relay and communicate the information to an integrator in connection with an arc flash detection system consistent with embodiments of the present disclosure.

FIG. 1B illustrates a simplified one-line diagram of a portion of an electric power system 100, including a merging unit 160 to receive information from an existing relay 120 and communicate the information to an integrator 150 in connection with an arc flash detection system consistent with embodiments of the present disclosure. According to various embodiments, existing relay 120 may obtain electric power system measurements, including current and/or voltage information. The existing relay 120 may provide protective functions for bus 104. The information gathered from existing relay 120 may also be provided to the merging unit 160 and may be used to provide arc flash event protection in an existing system.

In various embodiments, when the integrator 150 receives a signal indicating detection of a TOL event from the AFD unit 130, the integrator 150 may use information from the merging unit 160 to validate the occurrence of an electrical arc event. Since the integrator 150 receives electric current measurements from the existing relay 120, the integrator 150 may analyze the electric current measurements for abnormal electrical conditions, such as a 50PAF. In some instances, if the integrator 150 identifies an arc flash event based on electrical information provided by existing relay 120 via merging unit 160 and based on detection of light by AFD unit 130, integrator 150 may disrupt the flow of electrical current to the electrical arc event. In some cases, the integrator 150 may send command signals directly to the breaker 122 to open the breaker 122. In other cases, if abnormal electrical conditions and detection of light by AFD unit 130 do not both occur, integrator 150 may determine that the event is not an arc flash event and avoid unnecessarily disconnecting a portion of the electric power system 100.

Figure 2:
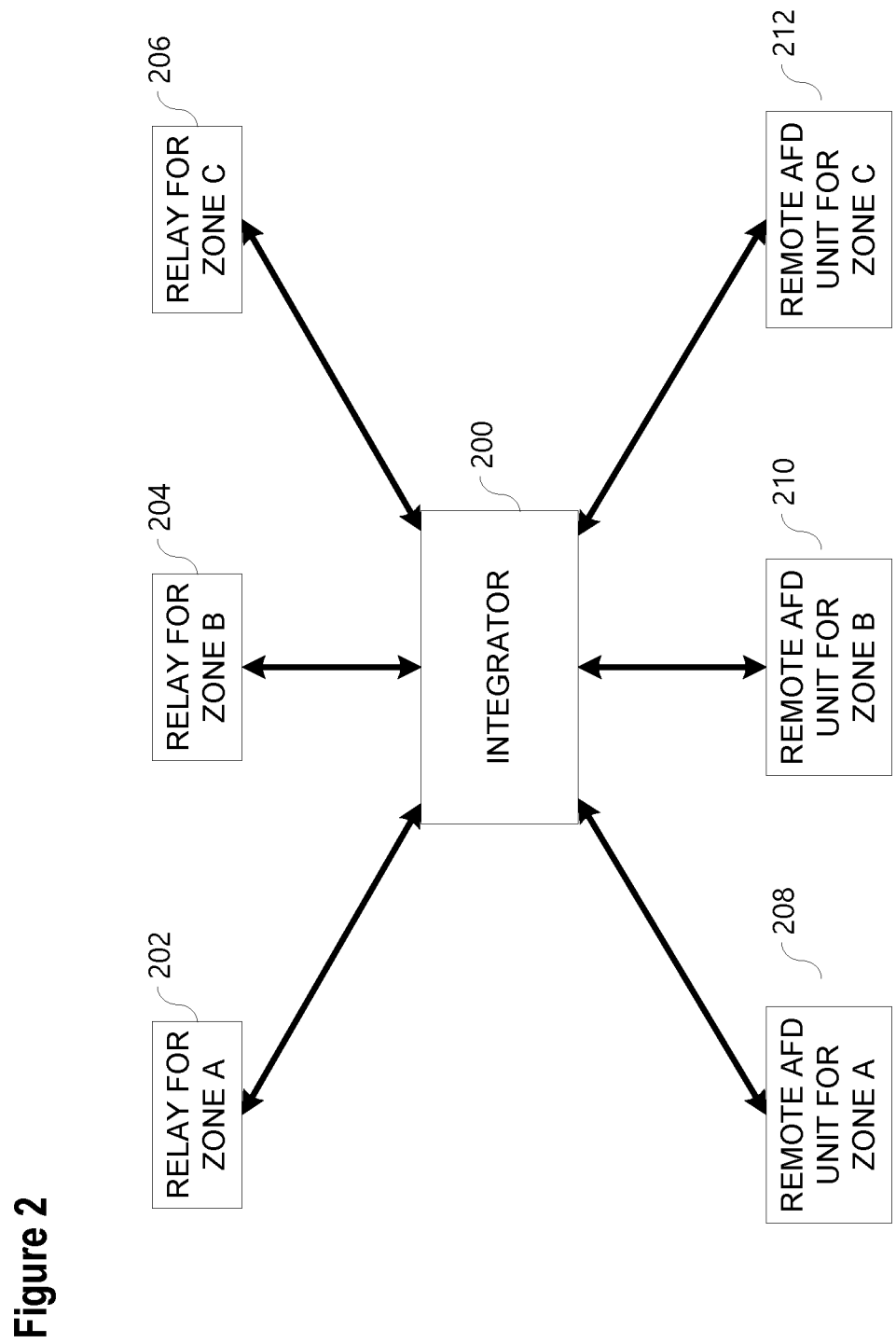
FIG. 2 illustrates a simplified diagram of a protection system, including a plurality of primary protective relays and a plurality of remote arc flash detection ("AFD") units in communication with an integrator consistent with embodiments of the present disclosure.

FIG. 2 illustrates a simplified diagram of a protection system, including a plurality of primary protective relays 202, 204, and 206 and a plurality of remote AFDs 208, 210, and 212 in communication with an integrator 200 consistent with embodiments of the present disclosure. Multiple primary protection relays 202, 204, and 206 may be used to provide reliable protection, such as interrupting the flow of electrical current feeding an electrical arc event, for a particular zone or portion of an electric power system. Moreover, multiple remote AFD units 208, 210, and 212 may be used to provide electrical arc event detection and protection for a particular zone or portion of the electric power system.

According to various embodiments, the remote AFD unit 208 may detect an occurrence of an electrical arc event in zone A of an electric power system and send a TOL event signal to an integrator 200. As discussed above, integrators (e.g., integrator 200) receive electric current measurements from primary protective relays (e.g., primary protective relays 202, 204, and 206). In this example, since the TOL event signal was sent from the remote AFD unit 208, the integrator 200 may analyze only the electric current measurements for a 50PAF from the primary protective relay 202 monitoring zone A. In some instances, if the integrator 200 identifies a 50PAF from the electric current measurements from the primary protective relay 202, the integrator 200 may determine that the electrical arc event is occurring or has occurred in zone A and send instructions to the primary protective relay 202 to interrupt the flow of electrical current to the electrical arc event. In some cases, the integrator 200 may send command signals directly to a device (e.g., a breaker) in zone A to disrupt the flow of electric current to the electrical arc event. If the integrator 200 does not identify a 50PAF from the electric current measurements from primary protective relay 202, the integrator 200 may identify that the detected electrical arc event is a false positive. Accordingly, the integrator 200 may avoid disconnecting zone A.

Figure 3:
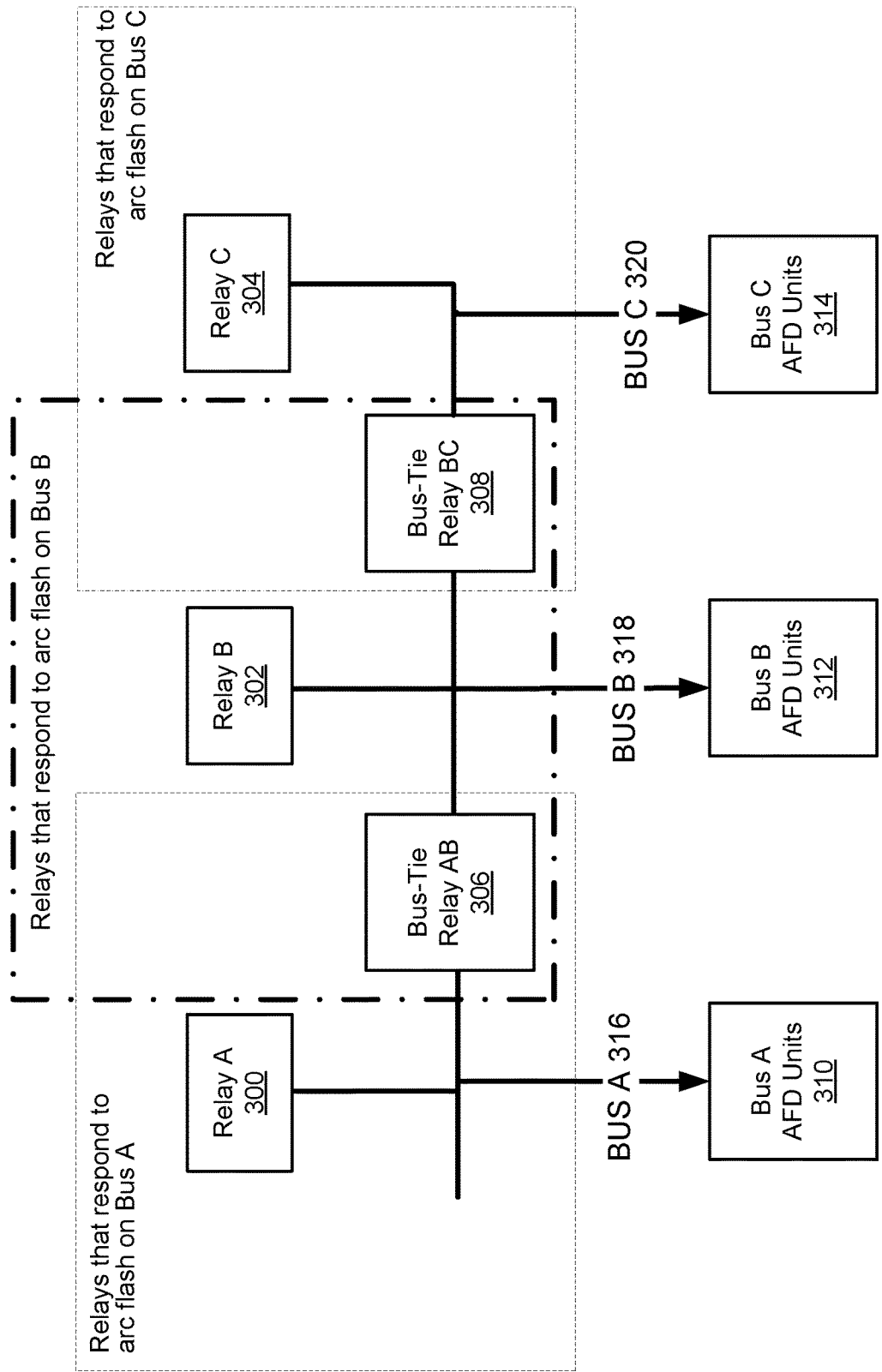
FIG. 3 illustrates a simplified diagram of a portion of an electric power system and a protection system, including a plurality of primary protective relays and a plurality of AFDs consistent with embodiments of the present disclosure.

FIG. 3 illustrates a simplified diagram of a portion of an electric power system and a protection system, including a plurality of primary protective relays 300-304 and a plurality of AFDs 310-314 consistent with embodiments of the present disclosure. As shown, the electric power system includes relays 300-304, bus-tie relays 306 and 308, AFD units 310-314, and buses 316-320. Multiple relays may be used to provide reliable protection to each bus. For example, relays 300 and 306 may provide protection to bus A 316, relays 302, 306, and 308 may provide protection to bus B 318, and relays 304 and 308 may provide protection to bus C 320. Furthermore, multiple AFD units may be used to provide electrical arc event detection and protection to each bus. For example, AFD unit 310 may provide electrical arc event detection and protection to bus A 316, AFD unit 312 may provide electrical arc event detection and protection to bus B 318, and AFD unit 314 may provide electrical arc event detection and protection to bus C 320.

According to various embodiments, AFD unit 310 may monitor bus A 316 and detect an occurrence of an electrical arc event on bus A 316 and send a TOL event signal to an integrator (not shown). The integrator may then analyze electric current measurements sent from Relay A 300 and Bus-Tie Relay AB 306 for a 50PAF. In some instances, if the integrator identifies a 50PAF from the electric current measurements from either the Relay A 300 or the Bus-Tie Relay AB 306, the integrator may determine that the electrical arc event is occurring or has occurred on bus A 316 and send instructions to the Relay A 300 and/or the Bus-Tie Relay AB 306 to interrupt the flow of electrical current to the electrical arc event. In some cases, the integrator may send command signals directly to a device (e.g., a breaker) on bus A 316 to interrupt the flow of electric current to the electrical arc event. In other cases, if the integrator does not identify a 50PAF from the electric current measurements from either the Relay A 300 or the Bus-Tie Relay AB 306, the integrator may identify that the detected electrical arc event is a false positive. Accordingly, the integrator may avoid disconnecting bus A 316.

In another example, AFD unit 312 may detect an occurrence of an electrical arc event on bus B 318 and send a TOL event signal to the integrator. The integrator may then analyze electric current measurements sent from Relay B 302, the Bus-Tie Relay AB 306, and Bus-Tie Relay BC 308 for a 50PAF. In some instances, if the integrator identifies a 50PAF from the electric current measurements from either the Relay B 302, the Bus-Tie Relay AB 306, or the Bus-Tie Relay BC 308, the integrator may determine that the electrical arc event is occurring or has occurred on bus B 318 and send instructions to the Relay B 302, the Bus-Tie Relay AB 306, and/or the Bus-Tie Relay BC 308 to interrupt the flow of electrical current to the electrical arc event. In some cases, the integrator may send command signals directly to a device on bus B 318 to interrupt the flow of electric current to the electrical arc event. In other cases, if the integrator does not identify a 50PAF from the electric current measurements from either the Relay B 302, the Bus-Tie Relay AB 306, or Bus-Tie Relay BC 308, the integrator may identify that the detected electrical arc event is a false positive. Accordingly, the integrator may avoid disconnecting bus B 318.

In another example, AFD unit 314 may detect an occurrence of an electrical arc event on bus C and send a TOL event signal to the integrator. The integrator may then analyze electric current measurements sent from Relay C 304 and the Bus-Tie Relay BC 308 for a 50PAF. In some instances, if the integrator identifies a 50PAF from the electric current measurements from either the Relay C 304 or the Bus-Tie Relay BC 308, the integrator may determine that the electrical arc event is occurring or has occurred on bus C 320 and send instructions to the Relay C 304 and/or the Bus-Tie Relay BC 308 to interrupt the flow of electrical current to the electrical arc event. In some cases, the integrator may send command signals directly to a device on bus C 320 to interrupt the flow of electric current to the electrical arc event. In other cases, if the integrator does not identify a 50PAF from the electric current measurements from either the Relay C 304 or the Bus-Tie Relay BC 308, the integrator may identify that the detected electrical arc event is a false positive. Accordingly, the integrator may avoid disconnecting bus C 320.

Figure 4:
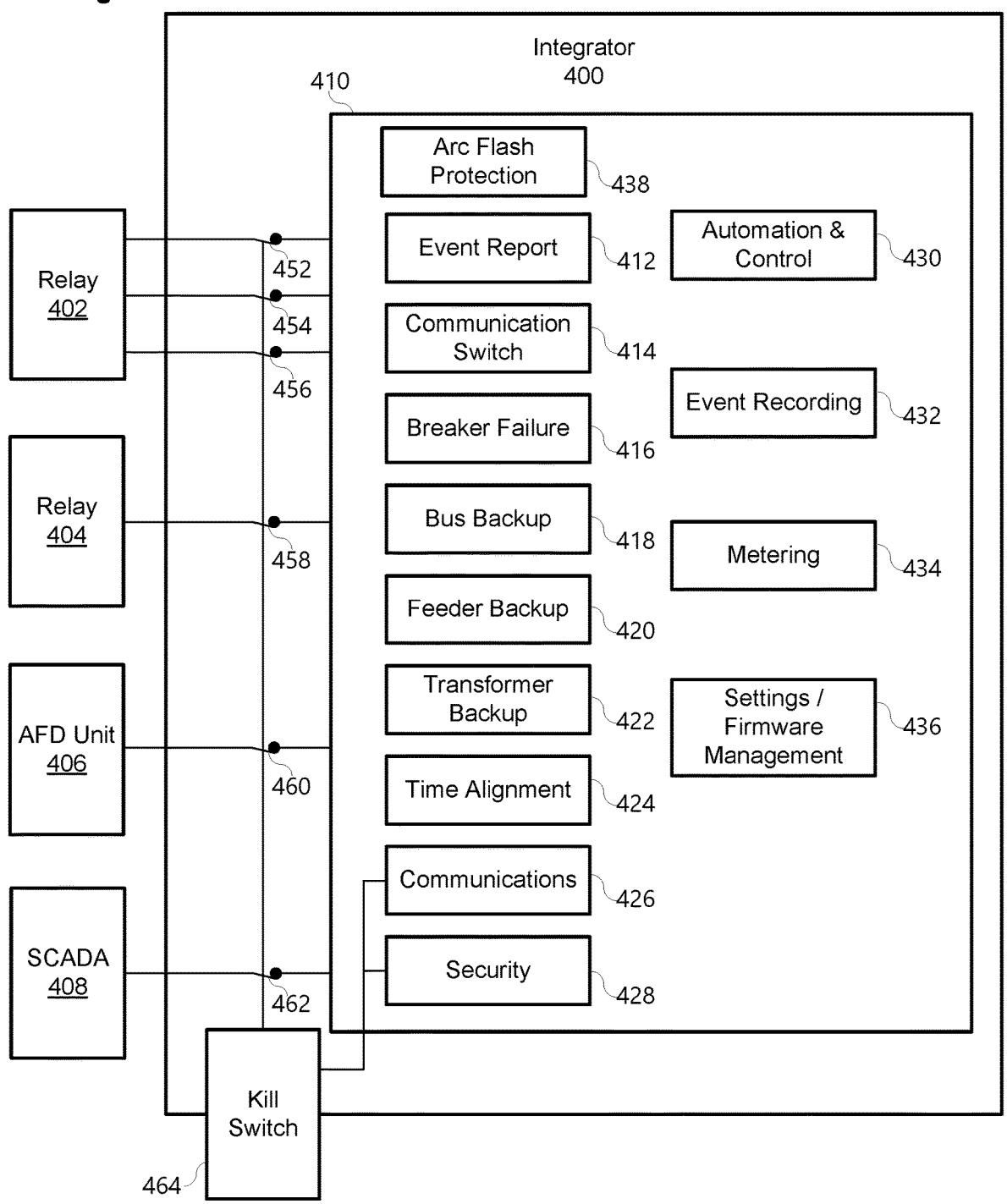
FIG. 4 illustrates a simplified block diagram of an integrator consistent with embodiments of the present disclosure.

FIG. 4 illustrates a simplified block diagram of an integrator 400 consistent with embodiments of the present disclosure. Integrator 400 facilitates the physical separation of protection functions (performed by the primary protective relays) from non-protective functions (performed by the integrator). The function of the integrator is to provide non-primary protective functions such as automation and backup protection for the power system, integration with other integrators, as well as communication with monitoring, automation, and supervisory systems. Additionally, the integrator may leverage the communication configuration with the primary protection relays and AFD units to provide a balance between adequate protection against electrical arc events and unnecessary interruptions based upon incorrect identification of an electrical arcing event (e.g., a false positive detection of an electrical arc event). In some embodiments, certain functions previously performed by IEDs protecting electric power systems that are not directly required for primary protection may be removed from the primary protective devices in accordance with the present disclosure, and performed by an integrator. Each integrator may be in communication with one or more primary protective devices, one or more AFD units, one or more other integrators, as well as other monitoring, automation, and supervisory systems.

As discussed above, the primary protective devices are configured to continue to provide protective functions to the electric power system even when the integrator or other monitoring, automation, and/or supervisory systems and devices are unavailable. Thus, protection of the electric power system continues through times of disruption or unavailability of the integrator (e.g. during electrical arc events, testing procedures, restart, upgrade, settings changes, hardware malfunction, software error, bit flip errors, physical attack, cyber attack, or the like). The integrator may be configured to stop its communication with primary protective devices in the event of a disruption or period of unavailability of the integrator so that such integrator disruption or unavailability cannot affect the protective functions of the primary protective devices.

As illustrated in FIG. 4, the integrator 400 includes a processing device 410 for executing instructions related to such functions. The processing device 410 may be any processor capable of executing computer instructions including, for example, a computer processor, a microprocessor, an FPGA, or the like, and may be packaged with or be in communication with computer memory for storing computer instructions to be executed by the processing device 410. The various operations that may be stored as computer instructions and, when executed by the processing device 410, performed by the integrator 400 include, for example, arc flash protection 438, event reporting 412, communications switching 414, breaker failure 416, bus backup protection 418, feeder backup protection 420, transformer backup protection 422, time alignment 424, communications 426, security 428, and the like. Additional functions that may be performed by the integrator 400 include automation and control 430. The integrator 410 may include event recording functions 432 where power system conditions, time, and actions taken are recorded for later retrieval and/or transmission using the event report function 412. The integrator 400 may perform metering operations 434. The integrator 400 may also perform settings and/or firmware management operations 436 such as maintaining current records of settings and firmware versions for each of the connected primary relays, updating settings on primary relays, updating firmware of primary relays, and the like.

The integrator 400 may be in communication with, and even facilitate communication among several different devices and systems including, for example: one or more primary protection relays 402, 404 (e.g., feeder protection relays, transformer protection relays, bus protection relays, motor relays, generator relay, etc.) and one or more AFD units 406. The integrator 400 may be in communication with other integrator(s), monitoring, automation, or supervisory systems such as, for example, SCADA 408. As suggested above, the integrator 400 may perform communication functions and may function as a communication switch among the various connected devices.

The integrator 400 may include one or more disconnect switches 452, 454, 456, 458, 460, 462 for selectively making and breaking communication paths with the various connected devices. Any configuration of switches capable of selectively breaking the communication pathways to the various devices may be used. The switches 452-462 may be in the form of electromagnetic relays capable of rapid disconnection. The switches 452-462 may be optical switches when communication with the devices uses optical media. In any case, the switches 452-462 may be configured to disconnect communication between the various devices and the integrator 400.

The switches 452-462 may be operated by a kill switch 464. When activated, the kill switch 464 may signal the switches to open (e.g. an electrical signal to a relay, an electrical signal to an optical switch, a physical action on physical contacts, or the like), thus disconnecting communications between the integrator 400 and the various devices, including the primary protection relays 402-404 and the AFD units 406. The kill switch 464 may be operated by various actions. According to various embodiments, the kill switch 464 may be activated from a dedicated physical input (e.g., pushbutton, membrane button, switch, or the like), remotely by a contact input from an external device (e.g., a SCADA system or an intrusion system), an internal security function operating on the integrator 400, remotely using the communications operation 426, etc.

Upon activation of the kill switch 464, the integrator 400 may be configured to issue an alarm signal. The alarm signal may be displayed using an alarm indication of the integrator 400. The alarm signal may be transmitted to other devices or supervisory systems using contact outputs. The alarm signal may be transmitted on SCADA 408 or otherwise on the communications media before the kill switch 464 opens the switches. In some embodiments the kill switch 464 may not disconnect the communication with SCADA 408 or select other devices or systems. In such embodiments, the integrator 400 may communicate the alarm to SCADA 408 or the select other devices or systems. The alarm signal may be useful for operators to be alerted that an anomaly has occurred and, although the power system remains protected using the primary protection devices, the integrator 400 has interrupted communications with the primary protection devices, and some functions may be offline.

In some cases, the arc flash protection 438 of the processing device 410 may also be responsible for leveraging the communication architecture between the primary protective relays 402, 404 and the AFD units 406 and perform electrical arc event validation. For instance, as shown in FIG. 4, the integrator 400 includes a communication port in communication with the primary protective relays 402, 404 and the AFD units 406. In various embodiments, when the integrator 400 receives a signal indicating detection of an occurrence of an electrical arc event from the AFD unit 406, the arc flash protection 438 may validate the detection of the electrical arc event. In some instances, the arc flash protection 438 may send instructions to the primary protective relays 402 and 404, using the communication port, to implement a protective action so that the current to the electrical arc event is interrupted. In other cases, by validating the detection of the electrical arc event, the arc flash protection 438 may recognize false positive detections of electrical arc events and avoid unnecessary interruptions of an electric power system.

For example, the arc flash protection 438 may receive a TOL event signal from the AFD unit 406. Since the arc flash protection 438 receives maintenance results, including electric current measurements, from the primary protective relays 402 and 404, the arc flash protection 438 analyzes the electric current measurements for abnormal electrical conditions such as, for example, a 50PAF. In some instances, if the arc flash protection 438 identifies a 50PAF from the electric current measurements, the arc flash protection 438 may determine that the electrical arc event is occurring or has occurred and send instructions to the primary protective relays 402 and 404 to interrupt the flow of electric current to the electrical arc event. In some cases, the arc flash protection 438 may send command signals directly to a device (e.g., a circuit breaker) in the electric power system to interrupt the flow of electric current to the electrical arc event. In other cases, if the arc flash protection 438 does not identify a 50PAF from the electric current measurements, the arc flash protection 438 may identify that the detected electrical arc event is a false positive. Accordingly, the arc flash protection 438 may avoid disconnecting the electric power system.

Figure 5:
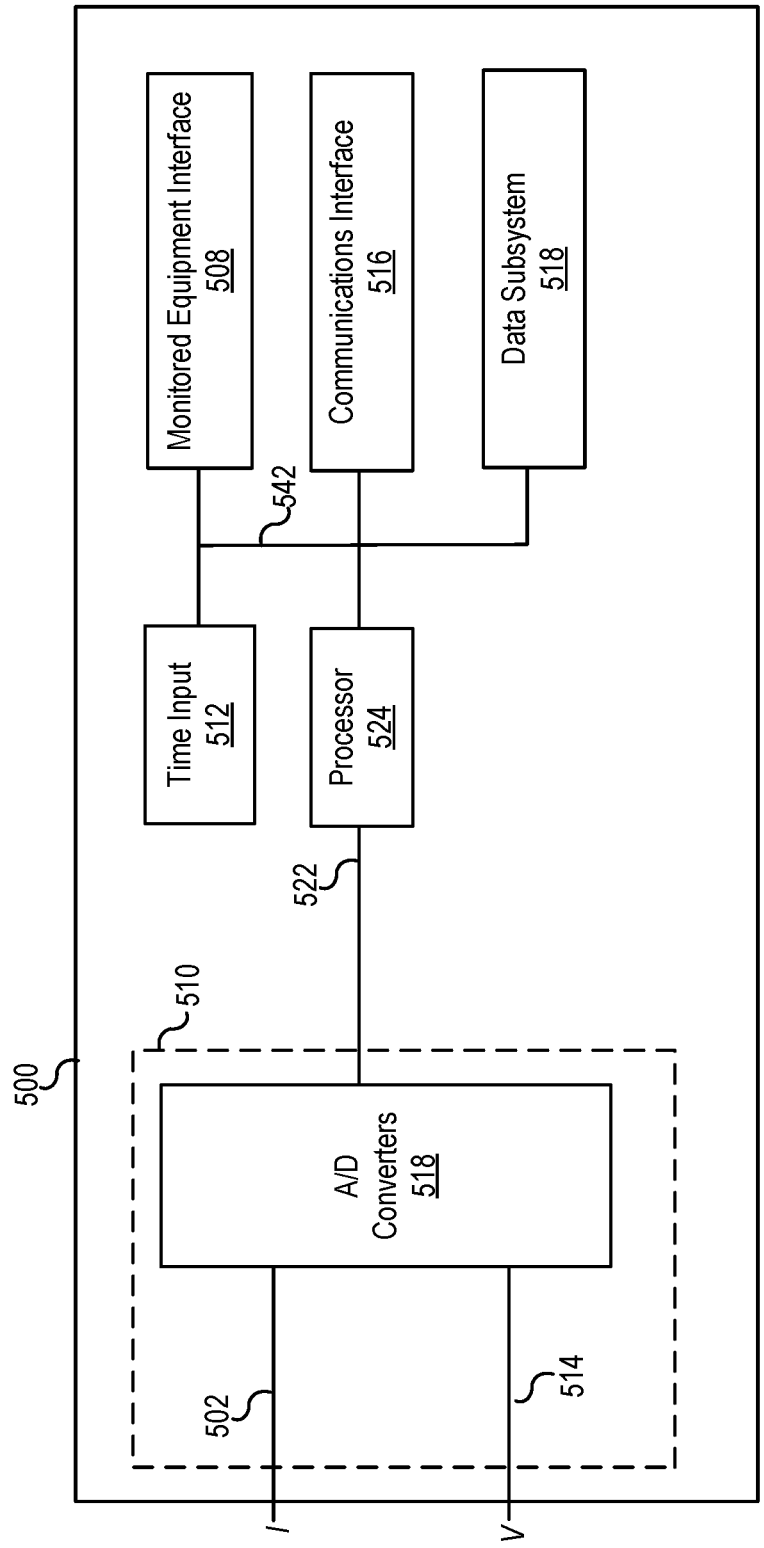
FIG. 5 illustrates a simplified block diagram of a merging unit consistent with embodiments of the present disclosure.

FIG. 5 illustrates a simplified block diagram of a merging unit 500 consistent with embodiments of the present disclosure. System 500 may be implemented using hardware, software, firmware, and/or any combination thereof. In some embodiments, system 500 may be embodied as an IED, while in other embodiments, certain components or functions described herein may be associated with other devices or performed by other devices. The specifically illustrated configuration is merely representative of one embodiment consistent with the present disclosure.

System 500 includes a communications interface 516 to communicate with devices and/or IEDs. In certain embodiments, the communications interface 516 may facilitate direct communication with other IEDs or communicate with systems over a communications network. System 500 may further include a time input 512, which may be used to receive a time signal (e.g., a common time reference) allowing system 500 to apply a time-stamp to the acquired samples. In certain embodiments, a common time reference may be received via communications interface 516, and accordingly, a separate time input may not be required for time-stamping and/or synchronization operations. One such embodiment may employ the IEEE 1588 protocol. A monitored equipment interface 508 may receive status information from, and issue control instructions to, a piece of monitored equipment (such as a circuit breaker, conductor, transformer, or the like).

Processor 524 processes communications received via communications interface 516, time input 512, and/or monitored equipment interface 508. Processor 524 may operate using any number of processing rates and architectures. Processor 524 may perform various algorithms and calculations described herein. Processor 524 may be embodied as a general-purpose integrated circuit, an application-specific integrated circuit, a field-programmable gate array, and/or any other suitable programmable logic device.

In certain embodiments, system 500 may include a sensor component 510. In the illustrated embodiment, sensor component 510 may receive high-fidelity current measurements 502 and/or high-fidelity voltage measurements 514. The sensor component 510 may comprise ND converters 518 that sample and/or digitize filtered waveforms to form corresponding digitized current and voltage signals provided to data bus 522. High-fidelity current measurements 502 and/or high-fidelity voltage measurements 514 may include separate signals from each phase of a three-phase electric power system. ND converters 518 may be connected to processor 524 by way of data bus 522, through which digitized representations of current and voltage signals may be transmitted to processor 524.

Data subsystem 518 may collect and format data for use by an integrator. Such data may include, among other things, measurements of electrical parameters. Such measurements may be used to detect abnormal electrical conditions such as, for example, a 50PAF. Detection of such conditions may be used in conjunction with optical sensors to identify an arc flash event and to disrupt the flow of electrical current to such an event.

Figure 6:
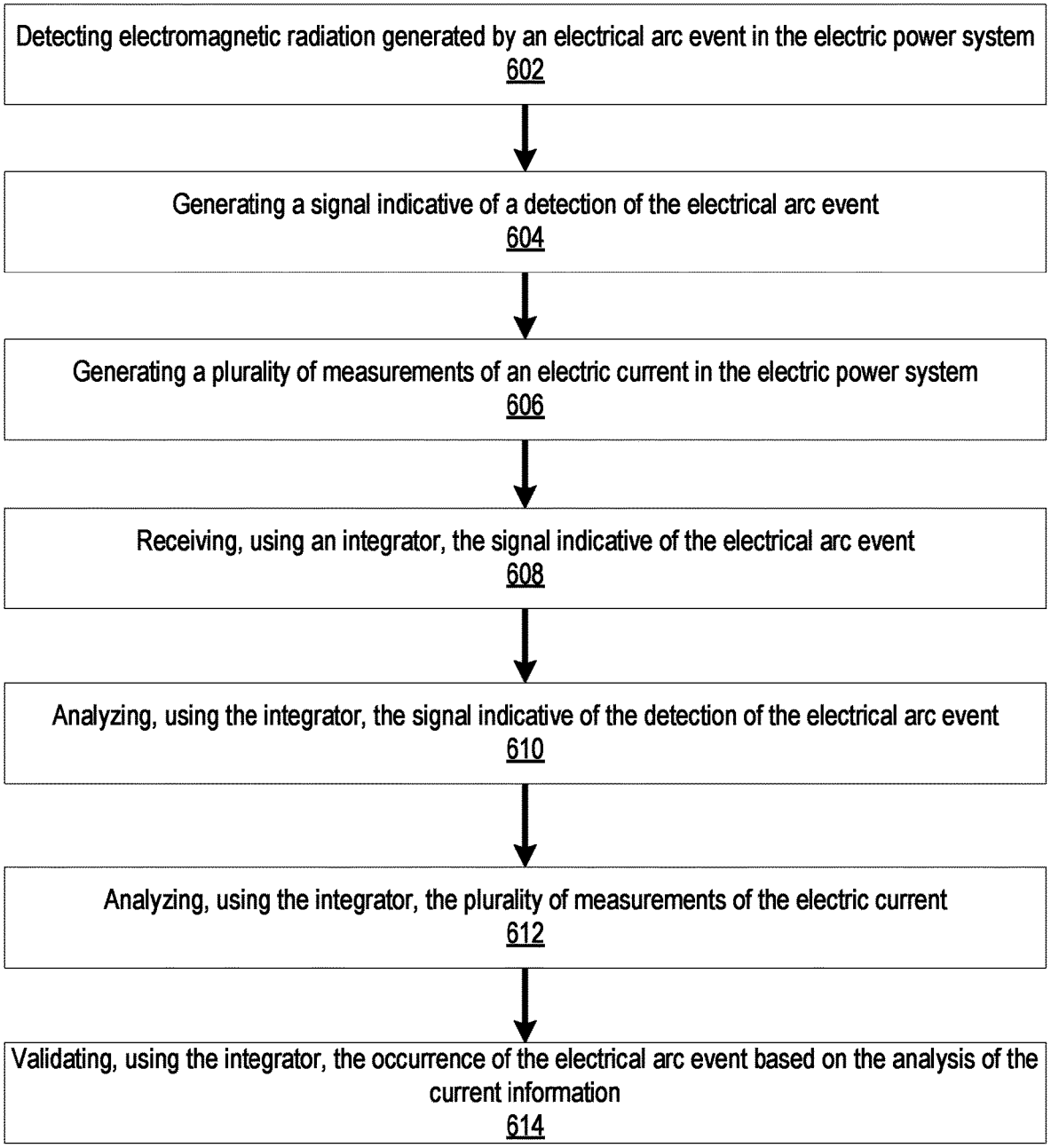
FIG. 6 illustrates a flow chart of a method for detecting electrical arc events in an electric power system consistent with embodiments of the present disclosure.

FIG. 6 illustrates a flow chart of a method 600 for detecting electrical arc events in an electric power system consistent with embodiments of the present disclosure. At 602, an AFD unit may detect electromagnetic radiation generated by an electrical arc event in the electric power system. At 604, the AFD unit may generate a signal indicative of a detection of the electrical arc event.

At 606, a primary protection relay may generate a plurality of measurements of an electric current in the electric power system. At 608, an integrator may receive the signal indicative of the electrical arc event. In some examples, the integrator may also receive the plurality of measurements of the electric current in the electric power system. At 610, a processing subsystem of the integrator may analyze the signal indicative of the detection of the electrical arc event. In some examples, a location of where the electrical arc event was detected may be identified from the AFD unit that detected the electrical arc event. For instance, each AFD unit may be designated to monitor a particular zone of the electric power system. As such, when an AFD unit detects an electrical arc event, the processing subsystem can locate the zone from the AFD unit that generated the indication.

At 612, the processing subsystem may analyze the plurality of measurements of the electric current. At 614, the processing subsystem may validate the detection of the electrical arc event based on the analysis of the plurality of measurements of the electric current. In some examples, the processing subsystem may also send instructions to generate a protective action to interrupt a flow of current to the electrical arc event. In some examples, the protective action may comprise disconnecting the zone of the electric power system to stop current to the electrical arc event.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A system to monitor for electrical arc events in an electric power system, comprising:
    an arc flash detection (AFD) unit to:
        detect electromagnetic radiation generated by an electrical arc event in the electric power system; and
        generate a signal indicative of a detection of the electrical arc event;
    a primary protection relay to generate a plurality of measurements of an electric current in the electric power system; and
    an integrator, comprising:
        a communication port in communication with the AFD unit and the primary protection relay, the communication port to:
            receive the signal indicative of the electrical arc event from the AFD Unit; and
            receive the plurality of measurements of the electric current in the electric power system from the primary protection relay; and
        a processing subsystem to:
            analyze the signal indicative of the detection of the electrical arc event;

analyze the plurality of measurements of the electric current;
validate the detection of the electrical arc event based on the analysis of the plurality of measurements of the electric current; and
generate a protective action to interrupt a flow of the current to the electrical arc event;
wherein the AFD unit is separate from the primary protection relay, and the primary protection relay is disposed upstream from the AFD unit.

2. The system of claim 1, wherein the integrator identifies a zone of the electric power system where the electrical arc event is located based on the AFD unit.

3. The system of claim 2, wherein the protective action comprises generation of a signal to disconnect the zone of the electric power system to stop current to the electrical arc event.

4. The system of claim 1, wherein validation of the detection of the electrical arc event comprises identifying a phase arc flash over current element from the plurality of measurements of the electric current.

5. The system of claim 1, wherein the AFD unit includes an optical sensor to detect the electromagnetic radiation generated by the electrical arc event.

6. The system of claim 5, wherein the optical sensor comprises one of a loop sensor and a point sensor.

7. The system of claim 1, wherein the set of primary protection relays stream the plurality of measurements of the electric current to the integrator at 10 kHz.

8. The system of claim 1, wherein the signal indicating detection of the occurrence of the electrical arc event comprises a time over light (TOL) event signal.

9. The system of claim 1, wherein the AFD unit is remote from the integrator.

10. The system of claim 1, wherein the AFD unit detects the electrical arc event in a zone of the electric power system and the integrator analyzes a portion of the plurality of measurements of the electric current from a set of the primary protection relays located in the zone of the electric power system to validate the occurrence of the electrical arc event.

11. A system to monitor for electrical arc events in an electric power system, comprising:
an arc flash detection (AFD) unit to:
detect electromagnetic radiation generated by an electrical arc event in the electric power system; and
generate a signal indicative of a detection of the electrical arc event;
a primary protection relay to:
generate a plurality of measurements of an electric current in the electric power system;
analyze the measurements of the electric current; and
identify an abnormal electric condition;
a merging unit to:
transmit a signal indicative of the abnormal electric condition from the primary protection relay; and
an integrator, comprising:
a communication port in communication with the AFD unit and the primary protection relay, the communication port to:
receive the signal indicative of the electrical arc event from the AFD unit; and
receive the signal indicative of the abnormal electric condition from the merging unit; and
a processing subsystem to:

validate the detection of the electrical arc event based on the signal indicative of the abnormal electric condition; and
generate a protective action to interrupt a flow of the current to the electrical arc event;
wherein the AFD unit is separate from the primary protection relay, and the primary protection relay is disposed upstream from the AFD unit.

12. The system of claim 11, wherein the integrator identifies a zone of the electric power system where the electrical arc event is located based on the AFD unit.

13. The system of claim 12, wherein the protective action comprises generation of a signal to disconnect the zone of the electric power system to stop current to the electrical arc event.

14. The system of claim 11, wherein the abnormal electric condition comprises a phase arc flash over current element.

15. The system of claim 11, wherein the AFD unit includes an optical sensor to detect the electromagnetic radiation generated by the electrical arc event.

16. The system of claim 15, wherein the optical sensor comprises one of a loop sensor and a point sensor.

17. The system of claim 11, wherein the AFD unit is remote from the integrator.

18. The system of claim 11, wherein the AFD Unit, merging unit, and integrator are configured to be added to an existing electric power system without replacement of the primary protective relay.

19. A method for detecting electrical arc events in an electric power system, comprising:
detecting, using an arc flash detection (AFD) unit, electromagnetic radiation generated by an electrical arc event in the electric power system;
generating, using the AFD unit, a signal indicative of a detection of the electrical arc event;
generating, using a primary protection relay, a plurality of measurements of an electric current in the electric power system;
receiving, using an integrator, the signal indicative of the electrical arc event generated by the AFD unit;
receiving, using the integrator, the plurality of measurements of the electric current in the electric power system generated by the primary protection relay;
analyzing, using a processing subsystem of the integrator, the signal indicative of the detection of the electrical arc event;
analyzing, using the processing subsystem of the integrator, the plurality of measurements of the electric current measurements;
validating, using the processing subsystem of the integrator, the detection of the electrical arc event based on the analysis of the plurality of measurements of the electric; and
generating a protective action, using the processing subsystem of the integrator, to interrupt a flow of current to the electrical arc event;
wherein the AFD unit is separate from the primary protection relay, and the primary protection relay is disposed upstream from the AFD unit.

20. The method of claim 19, further comprising:
identifying a zone of the electric power system where the electrical arc event is located based on the AFD unit.

21. The method of claim 20, wherein the protective action comprises disconnecting the zone of the electric power system to stop the current to the electrical arc event.

22. A system to monitor for electrical arc events in an electric power system, comprising:

an arc flash detection (AFD) unit to:
  generate a measurement of electromagnetic radiation generated by an electrical arc event in the electric power system; and
  transmit the measurement of electromagnetic radiation; and
an integrator, comprising:
  a communication port to:
    receive the measurement from the AFD unit;
    receive a signal indicative of an abnormal electric condition from a primary protection relay; and
  a processing subsystem to:
    identify the electrical arc event based on the signal indicative of the abnormal electric condition and the measurement of electromagnetic radiation from the AFD unit; and
    generate a protective action to interrupt a flow of the current to the electrical arc event;
wherein the AFD unit is separate from the primary protection relay, and the primary protection relay is disposed upstream from the AFD unit.

\* \* \* \* \*